June 6, 1944.     F. M. MILEK     2,350,692
FISHING TOOL
Filed Dec. 28, 1943
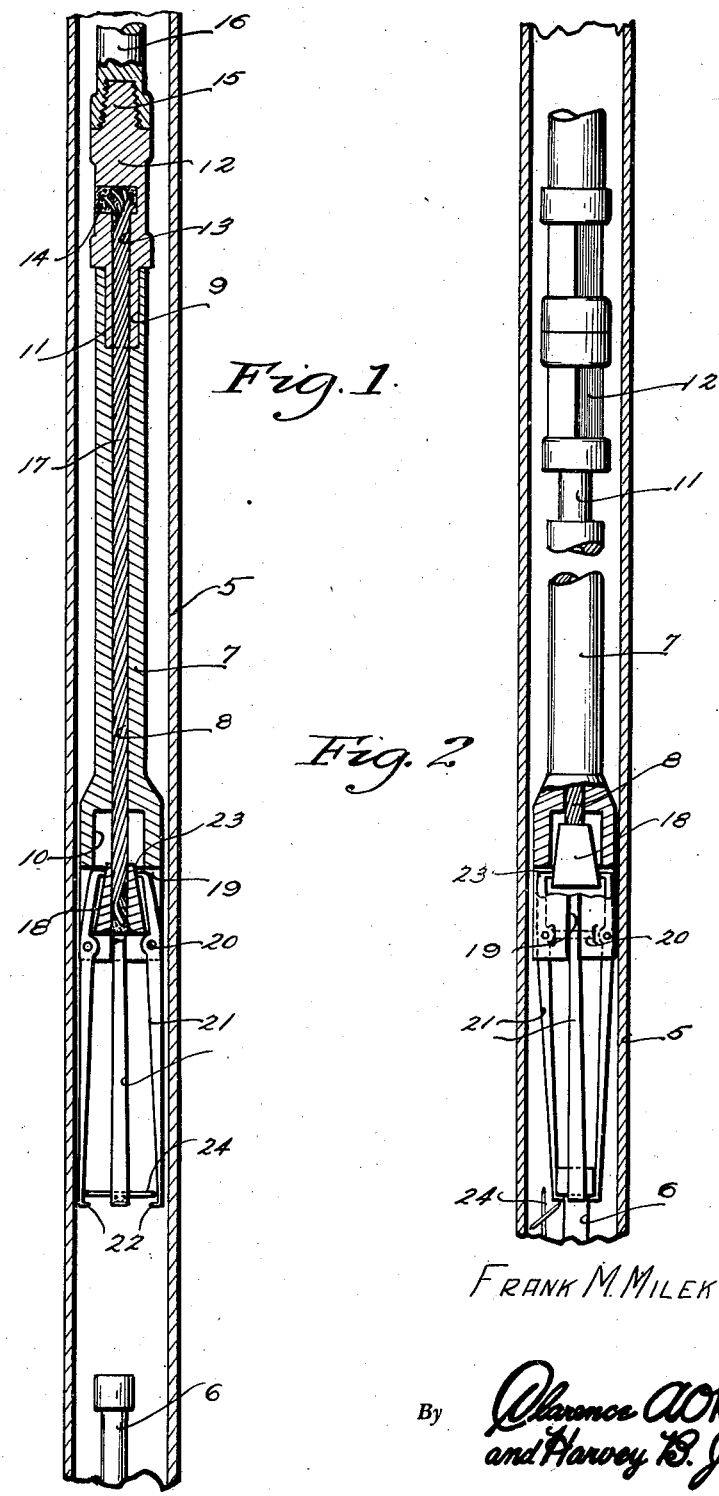
Inventor
FRANK M. MILEK
By Clarence A. O'Brien
and Harvey B. Jacobson
Attorneys Patented June 6, 1944

2,350,692

UNITED STATES PATENT OFFICE 2,350,692

FISHING TOOL

Frank M. Milek, Thermopolis, Wyo., assignor of fifty per cent to Alexander Healy, Jr., Worland, Wyo.

Application December 28, 1943, Serial No. 515,962

3 Claims. (Cl. 294—116)

The present invention relates to new and useful improvements in fishing tools for oil wells of a type embodying a plurality of pivoted gripping jaws normally held open by loose props adapted for displacement by contact with a lost tool in the well to release the jaws and employing the use of a conical spreader at the inner ends of the jaws to close the same about the lost tool by an upward movement of the fishing tool.

An important object of the invention is to provide a tool of this character of simple and practical construction which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a longitudinal sectional view of the tool with the jaws set for grabbing a lost tool in the well, and Figure 2 is a side elevational view with parts shown in section and showing the jaws closed.

Referring now to the drawing in detail, the numeral 5 designates a well casing showing a lost tool 6 therein.

The fishing tool comprises a barrel 7 having a bore 8 therein, at the upper end of which is a counter-bore 9 and at its lower end a socket 10. Slidably mounted in the upper counter-bore 9 is a reduced stem 11 on a coupler 12 also having a longitudinal bore 13 terminating in a lateral bore 14. The upper end of the coupler 12 is formed with a reduced threaded stem 15 adapted for attaching to a drill stem 16.

A wire cable 17 is slidably mounted in the bore 8 and extends upwardly into the bore 13 and into the lateral bore 14 where it is secured by solder or the like.

The lower end of the cable extends into a frusto-conical spreader 18 and is also anchored therein by solder or the like, the spreader being loosely positioned in the socket 10 and movable upwardly therein by an upward movement of the cable and connector.

The lower end of the socket is formed with a plurality of longitudinally extending slots 19 which are bridged by pins 20 on which are pivotally mounted elongated fingers or jaws 21 intermediate their ends, the lower ends of the jaws projecting downwardly below the barrel and are formed with inturned ends 22. The upper ends of the jaws above the pins 20 are slightly inclined inwardly and also formed with inturned ends 23 engaging the sides of the spreader 18.

The jaws are arranged in opposed pairs and before placing the fishing tool in the well the barrel 7 is moved upwardly onto the connector to permit lowering of the spreader so that the jaws will open their maximum distance. The jaws are held open by props 24 forced between the opposed pairs of jaws.

As the fishing tool is lowered into the well, the lost tool 6 will contact the props 24 and displace them as the tool 6 enters the jaws.

When the pump rod is pulled upwardly the cable 17 will pull the spreader 18 upwardly closing the lower ends of the jaws on the lost tool for pulling the latter upwardly with the rod.

It is believed that the details of construction and manner of use of the device will be readily understood from the foregoing without further detailed explanation.

Having described the invention, what is claimed as new is:

1. A fishing tool comprising a barrel, a cable slidably extending through the barrel, a rod coupler attached to the upper end of the cable, said barrel and coupler having sliding interfitting engagement, a plurality of cooperating jaws pivotally connected to the barrel and projecting below the barrel into a position for gripping the end of a tool, and a spreader attached to the lower end of the cable and adapted upon an upward movement thereof to close the jaws.

2. A fishing tool comprising a barrel, a cable slidably extending through the barrel, a rod coupler attached to the upper end of the cable, said barrel and coupler having sliding interfitting engagement, a plurality of cooperating jaws pivotally connected to the barrel and projecting below the barrel into a position for gripping the end of a tool, a prop removably positioned between the jaws to hold the latter in an open position, said prop being displaced by entrance of a tool into the jaws, and a spreader attached to the lower end of the cable and adapted upon an upward movement thereof to close the jaws.

3. A fishing tool comprising a barrel, a cable slidably extending through the barrel, a rod coupler attached to the upper end of the cable, said barrel and coupler having sliding interfitting engagement, a socket at the lower end of the barrel having longitudinal slots in the edge thereof, a jaw pivoted in each slot and projecting downwardly below the barrel, a prop loosely positioned between the lower ends of the jaws to hold the jaws open, said prop being disposed in the path of a tool entering the jaws to displace the prop, and a tapered spreader attached to the lower end of the cable and working in the socket between the upper ends of the jaws to close the jaws upon an upward movement of the coupler and cable.

FRANK M. MILEK.